(12) United States Patent
Nagaoka et al.

(10) Patent No.: US 6,759,355 B2
(45) Date of Patent: Jul. 6, 2004

(54) COATED FABRIC AND AIRBAG

(75) Inventors: Toshirou Nagaoka, Nobeoka (JP); Hideaki Ishii, Ashiya (JP)

(73) Assignee: Asahi Kasei Kabushiki Kaisha, Osaka (JP)

( * ) Notice: Subject to any disclaimer, the term of this patent is extended or adjusted under 35 U.S.C. 154(b) by 0 days.

(21) Appl. No.: 10/181,816

(22) PCT Filed: Apr. 6, 2001

(86) PCT No.: PCT/JP01/03009

§ 371 (c)(1),
(2), (4) Date: Jul. 23, 2002

(87) PCT Pub. No.: WO01/77435

PCT Pub. Date: Oct. 18, 2001

(65) Prior Publication Data

US 2003/0060103 A1 Mar. 27, 2003

(30) Foreign Application Priority Data

Apr. 7, 2000 (JP) .......................................... 2000-106914
Jan. 15, 2001 (JP) .......................................... 2001-006810
Jan. 29, 2001 (JP) .......................................... 2001-020472

(51) Int. Cl.$^7$ .............................................. B32B 27/02
(52) U.S. Cl. .......................... 442/164; 106/2; 220/415; 280/728.1; 280/730.1; 383/3; 428/12; 428/34.1; 428/34.3; 428/35.2; 428/35.7; 428/35.9; 428/36.1; 428/36.8; 428/36.9; 428/36.91; 428/195; 428/340; 428/341; 442/65; 442/66; 442/67; 442/76; 442/104; 442/168; 442/183; 442/286; 442/290
(58) Field of Search ............................ 106/2; 220/415; 280/728.1, 730.1; 383/3; 428/12, 34.1, 34.3, 34.5, 35.2, 35.7, 35.9, 36.1, 36.8, 36.9, 36.91, 195, 340, 341; 442/65, 66, 67, 76, 104, 168, 183, 286, 290

(56) References Cited

U.S. PATENT DOCUMENTS

| | | | |
|---|---|---|---|
| 5,296,278 A | 3/1994 | Nishimura et al. | 428/36.1 |
| 5,529,837 A | 6/1996 | Fujiki et al. | 428/266 |
| 5,989,660 A | * 11/1999 | Moriwaki et al. | 428/35.2 |
| 6,283,507 B1 | 9/2001 | Kami et al. | 280/743.1 |

FOREIGN PATENT DOCUMENTS

| | | |
|---|---|---|
| JP | 6-8779 | 1/1994 |
| JP | 8-41751 | 2/1996 |
| JP | 11-293541 | 10/1999 |
| JP | 2000170080 A | 6/2000 |
| WO | WO 01/09416 A1 | 8/2001 |

* cited by examiner

Primary Examiner—Arti R. Singh
(74) Attorney, Agent, or Firm—Finnegan, Henderson, Farabow, Garrett & Dunner, L.L.P.

(57) ABSTRACT

An air impermeable coated fabric, characterized in that it comprises a base fabric comprising fibers having a total fineness (yarn size) of 67 to 350 dtex and an elastomer film formed by application on at least one surface thereof, and the coated surface has friction coefficients (MIU) both in the warp direction and in the weft direction of 0.01 to 0.3, as measured according to KES measurement and the difference between the two friction coefficient values of 0.15 or less in an absolute value. The coated fabric has a coated surface having significantly improved sliding characteristics and thus is useful for manufacturing an air bag capable of being developed in a short time and with uniformity.

10 Claims, 5 Drawing Sheets

COATED FABRIC AND AIRBAG

TECHNICAL FIELD

The present invention relates to a coated fabric excellent in friction characteristics and tear strength. The present invention relates, in more detail, to a coated fabric, used for producing lightweight airbags excellent in deployability and stowability, and an airbag.

BACKGROUND ART

Equipping an automobile with airbag as occupant-protecting safety systems, has become standard. An airbag as an occupant-protecting safety system is usually mounted, in a defined site such as a steering wheel or an instrument panel, as a module including an inflator case. Therefore, the storage volume of an airbag is required to be small (compact). In order to produce an airbag with a small storage volume, a woven fabric prepared from a fine yarn is used as a base fabric, and the type and coating amount of an elastomer used for coating are adjusted. For example, the size of the weaving yarn of the base woven fabric has been reduced from 940 dtex to as small as 470 dtex. Moreover, the type of elastomer has been changed from chloroprene to silicone, and the coating amount has been changed from 90 to 120 g/m$^2$ to 40 to 60 g/m$^2$. Recent requirements for an airbag that has been made lightweight and compact are as follows: to make the base fabric more lightweight; to make the hand touch of the base fabric softer; and to make the coated fabric lightweight by decreasing the coating amount of the elastomer. In order to satisfy the requirements, it is indispensable to solve the following technical problems explained below. One of the problems relates to a reduction in the coating amount of a silicone resin composition, and the following two problems arise: (1) a problem of ensuring air-impermeability; and (2) a problem of flame proofness and ensuring the qualification of burning speed defined by FMVSS 302. Another problem is associated with the problem of making an airbag soft. This problem relates to an improvement in the deployability of a lightweight airbag which can be compactly stowed in the airbag module. When an occupant is properly seated at a standard predetermined seating position, and the distance between the occupant and the airbag is small, namely, even when the delayed occupant restraint time is short, the airbag is required to be able to restrain the occupant by rapidly and completely deploying within several tens of milliseconds (msec). Thus, the problem of softening an airbag relates to an improvement in the airbag which improvement makes it have the following highly excellent properties; the airbag in a more compactly stored state smoothly deploys in a short period of time.

As disclosed in Japanese Unexamined Patent Publication (Kokai) No. 6-8779, the coated film of elastomer on a fabric for the conventional airbag is predominantly applied to meshed openings of a woven fabric. When the coating amount of an elastomer is 25 g/m$^2$ or less, on the base woven fabric, the coated elastomer on yarn portions other than the mesh openings of the fabric is decreased, and the spaces between single filaments in the weaving yarn portions are not completely covered. As a result, a base fabric having predetermined air-shielding properties cannot be obtained. Since an airbag must basically function so that the airbag deploys in a short period of time to restrain an occupant, the airbag is desirably formed from a gas impermeable fabric that can completely utilize the gas generated by an inflator. Moreover, for a fabric structure prepared by unevenly coating a fabric with an elastomer, portions of the applied coating where the thickness is small are broken during a burning test by FMVSS 302 reguration, and diffusion of the burning gas cannot be suppressed. As a result, a coated fabric that will be rejected after a FMVSS 302 burning test is formed.

Japanese Unexamined Patent Publication (Kokai) No. 7-300774 discloses a coated fabric for airbags that has a 5 to 20 μm thick coated film of a pigment-containing silicone resin composition containing from 5 to 10% by weight of a pigment and that passes a FMVSS 302 burning test. However, because the coated fabric is prepared in a method wherein the coated film is formed in a gap between the woven base fabric surface and the knife of a coating head, and the coated film has a thickness approximately equal to the gap, it is understood that the surface of the 5 to 20 μm thick coated film, formed after filling recesses and protrusions on the woven fabric surface, forms a flat, even surface. The coated fabric naturally shows a high frictional fabric face due to the flat, smooth coated film surface.

International Patent Publication WO 01-09416 discloses an airbag formed from a self-extinguishing, uncoated fabric in which a high density woven fabric composed of a fine yarn (a yarn size of 250 dtex or less, and a single filament size of 4.5 dtex or less) is used as a base fabric, and particularly discloses a base fabric which is prepared by applying a lubricant to an unscoured woven fabric and from which a small, lightweight, compact airbag can be obtained.

However, for a conventional light weight airbag that can be folded in a small size and compactly stowed in the airbag module, no specific attempt has been known to design a coated fabric capable of providing an air bag with an improved all-out performance covering deployability enabling air bag to deploy with a shorted period of time, resistance to inflating pressure at deployment air impermeability and flame proofness.

Furthermore, an object of the present invention is to realize a lightweight airbag that can satisfy the requirements that the airbag shows a short deployment time, an excellent deployment uniformity and the ability to rapidly restrain an occupant, that is excellent in deployment pressure resistance and that can be compactly stowed in the casing of an airbag system.

A more specific object of the present invention is to provide a lightweight coated fabric that is flexible although it has a gas impermeable elastomer coating and that shows improved friction characteristics and tear strength. A further object of the present invention is to provide a lightweight coated fabric that shows an air-shielding ability advantageous to airbag deployment even when the coating amount of the elastomer coating is small, and that passes flame proofness and burning speed tests defined by FMVSS 302.

BRIEF DESCRIPTION OF THE DRAWINGS

FIG. 1 shows an instance of a deployment shape exhibited at 14 msec after starting the deployment of a uniformly deployable airbag.

FIG. 2 shows an instance of a deployment shape exhibited at 19 msec after starting the deployment of a uniformly deployable airbag.

FIG. 3 shows an instance of a deployment shape exhibited at 14 msec after starting the deployment of an airbag that deploys nonuniformly.

FIG. 4 shows an instance of a deployment shape exhibited at 19 msec after starting the deployment of an airbag that deploys nonuniformly.

FIG. 5 shows an instance of a deployment shape exhibited by a completely deployed airbag (48 msec after starting the deployment).

DISCLOSURE OF THE INVENTION

Figure 1:
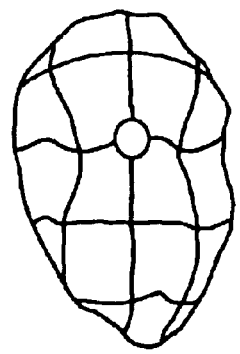
FIGS. 1 to 5 are views showing the deployment action, from the start to completion of deployment, of airbags for driver's seats in deployment tests which illustrate the process of deployment action, with time, that is obtained by observing the airbags being deployed from the front thereof with a high speed VTR.

A conventional coated fabric prepared by forming an air gas impermeable elastomer coating layer on the surface of a base fabric such as a woven fabric lacks in slidability because the coating surface has sticky properties, and has a significantly larger coefficient of friction than the base woven fabric. Moreover, a coated fabric, even whose the woven base fabric has small METSUKE (basis of weight of fabric; weight per unit area of fabric) is formed of a weaving yarn having a relatively small size, loses flexibility imparted by the base woven fabric because of the presence of the elastomer coating layer. The present inventors have paid attention to the phenomena, and solved the problems of the present invention by elaborately modifying the shape and layer structure of the coating surface of a lightweight air gas impermeable coated fabric.

The present invention provides an air gas impermeable coated fabric formed by coating a base fabric composed of a yarn that has a yarn size from 67 to 350 dtex and that is formed from single filaments having a size from 0.5 to 4.5 dtex with an elastomer on at least one surface, the coated fabric being characterized by that the coefficient of friction (MIU: Mean value of the coefficient of friction [no units]) of the gas impermeable coating surface on the fabric measured by KES is from 0.01 to 0.3 both in the warp and in the weft directions, and that the absolute value of the difference between a coefficient of friction (MIU) of the coating surface in the warp direction and a coefficient of friction (MIU) thereof in the weft direction is 0.15 or less.

The gas-impermeable coated fabric of the present invention is a fabric prepared by forming a gas-impermeable coating layer by coating a base fabric composed of a yarn that is formed from single filaments having a size from 0.5 to 4.5 dtex and that has a yarn size from 67 to 350 dtex with an elastomer on at least one side. The term gas-impermeable herein means that the coated fabric is gas impermeable to gas to such a degree that the deployment of the airbag in an airbag system in which the coated fabric of the invention is to be used, is ensured.

A measurement by KES (Kawabata's evaluation system for fabric) herein refers to a method of measuring basic dynamic characteristics of a fabric for the purpose of digitizing the feeling, namely, the touch of a fabric that a human body perceives, and is defined in the reference: The Standardization and Analysis of Hand Evaluation, $2^{nd}$ Ed., S. Kawabata, the Textile Machinery Society of Japan, July 1980. The coefficient of friction (MIU) measured by KES is a coefficient of friction (MIU) value obtained by the following procedure: a specified friction probe is slided in the warp and weft directions on a sliding sample fabric horizontally held with a constant tension while a static load is being applied by the friction probe, and the coefficient (MIU) is a value detected by a tension (namely friction force) applied to the friction probe. The surface sliding state of the coated fabric of the invention can be evaluated by measuring the coefficient of friction by KES. The measurement conditions will be described in detail later.

The coating surface of the coated fabric in the present invention is made to have a non-mirror-like form with recesses and protrusions. As a result, the coating surface is modified to have a decreased coefficient of friction compared with that of the base fabric. Moreover, the coated fabric of the present invention is specific in that the difference between a coefficient of friction in the warp direction and a coefficient of friction in the weft direction of the coating surface is extremely small, and that the coating surface is not anisotropic with respect to sliding along the warp direction and along the weft direction.

Since the sliding of the coating surface of the coated fabric in the present invention is improved as explained above, the deployment time of a compactly folded airbag can be shortened. Since the coated fabric of the present invention has no anisotropy with respect to a coefficient of friction in the warp direction and a coefficient of friction in the weft direction, the sliding of the fabric surface during airbag deployment is substantially uniform in all the directions. As a result, the difference between a deployment speed in the warp direction and one in the weft direction of the fabric substantially disappears; the form of an airbag having a symmetrical shape such as a circular one is symmetrically deployed. Consequently, an airbag that can rapidly and surely restrain the occupant can be obtained.

The friction characteristics of the coated fabric in the present invention can be obtained by forming an elastomer coating layer the surface of which has recesses and protrusions along the contours of the recesses and protrusions on the surface of a base fabric, such as a woven fabric. Moreover, the coating layer is formed without substantial penetration into the interior of the base fabric cross section. As a result, formation of a hard fabric caused by the penetration of the elastomer into the interior of the fabric is prevented. The flexibility that the fabric initially has can thus be utilized, and the tear tenacity of the coated fabric can be improved as well.

The coated layer having such a surface shape is a layer formed on the base fabric surface and containing 1 to 25 g/m² of an elastomer solid component, and is an elastomer layer having a film thickness ratio of the thickness in the maximum coated layer thickness portion to the thickness in the minimum coated layer thickness portion of less than 3. The coated fabric of the present invention has a predetermined modified surface, and the fabric exhibits neither destruction of an incinerated layer in a thin layer coating portion nor spreading of fire caused by diffusion of a combustion gas. The coated fabric therefore shows a flame resistance that passes the FMVSS 302 burning test.

For the surface characteristics of the coated fabric in the present invention, the surface roughness (Ra) of the coating surface is from 1.5 to 12 µm. The surface roughness (Ra) indicates that the coated fabric surface is also in a recessed and protruded state. The surface roughness (Ra) herein is a value obtained by measuring the recesses and protrusions of the coating surface as height displacements with a three coordinate measuring machine using a laser reflection type displacement meter (trade name of LT-8010, having a laser spot diameter of 2 µm, manufactured by Keyence Corporation) as a probe. The tracer surface roughness (SMD: Mean deviation of surface roughness <unit: micron>) in measurement by KES of the coating surface in the warp and weft directions is specified to be from 2 to 10 µm. The tracer surface roughness in measurement by KES is an evaluation of a roughness of the coated fabric sensed by a human body when the human body is contacted with the fabric. The tracer surface roughness (SMD) in measurement by KES is obtained as follows: a contact probe defined by KES is placed on a sample, and the surface roughness is detected by the up-and-down movement of the contact probe. The surface roughness is expressed by the standard deviation of vertical displacements of the contact probe.

The coated fabric of the present invention can be produced by a method comprising coating, by a knife coater, a woven fabric, composed of a weaving yarn that is formed from filaments with a single filament size from 0.5 to 4.5 dtex and that has a yarn size from 67 to 350 dtex and has a woven yarn size parameter that is represented by the product of a weave density and a size of the weaving yarn of from 9,000 to 22,000 end(or pick)·dtex/2.54 cm both in the warp and in the weft directions, with an elastomer having a viscosity from 5,000 to 200,000 mPa·s in an amount of 1 to 25 g/m² under a contact pressure from 1 to 100 kgf/m at the relative speed of a coating head of 1 to 100 m/min, preferably 10 to 50 m/min, and subjecting the coated woven fabric to crosslinking treatment.

When the coated fabric of the present invention is used, all types of airbags for driver's seats, passenger's seats, and the like, can be made excellent in a response at the time of collision because the airbags show a short deployment time and no deployment anisotropy and lightweight airbags that can be compactly stowed in airbag module can be manufactured.

BEST MODE FOR CARRYING OUT THE INVENTION

The present invention will be specifically explained below.

The coated fabric of the present invention may be either a single-coated one that is coated on one side or a double-coated one that is coated on both sides.

The surface of the coating, which is formed from an elastomer, of the coated fabric in the present invention shows a coefficient of friction (MIU), which is measured by KES, of 0.01 to 0.3, preferably 0.05 to 0.25 both in the warp and in the weft directions. The sliding of the coating surface during the deployment of an airbag is improved by making the coefficient of friction (MIU) 0.3 or less, and the deployment time of a compactly folded airbag can be shortened.

The airbag obtained from a coated fabric having a coating on one side is usually a bag that is prepared by sewing the coated fabric so that the coating surface of the fabric is situated inside the bag. The bag is folded, and stowed in the casing of the airbag in an airbag module. When the airbag is deployed, a sliding between the coating faces of the coated fabric and sliding between the uncoated faces take place simultaneously. A poor sliding between the coating faces hinders shortening of the deployment time. Improvement of the friction characteristics of the surface of the coat is, therefore, significant.

The coated fabric of the present invention has a difference between a coefficient of friction (MIU) in the warp direction and a coefficient of friction (MIU) in the weft direction of 0.15 or less. Since the surface properties of the base fabric in the warp direction often differ from those in the weft direction depending on the tensile history, etc. during the production step, the coated fabric is anisotropic with respect to the coefficient of friction in the warp direction and that in the weft direction. The degree of anisotropy in the surface friction characteristics can be decreased, and the difference between a coefficient of friction (MIU) in the warp direction and one (MIU) in the weft direction of the coated fabric can be made 0.15 or less by forming a unique coating layer. When the difference between the two coefficients of friction (MIU) on the coating surface of the coated fabric is 0.15 or less, the airbag shows excellent uniformity of deployment. That is, the fabric of the airbag slips uniformly, and the difference between a deployment speed in the warp direction and one in the weft direction disappears. As a result, an airbag having a symmetric shape such as a circular shape is symmetrically deployed during deployment so that the occupant can be quickly restrained.

Measurement by KES for detecting the friction characteristics of a fabric surface is conducted by the following procedure in the present invention: a sample fabric is affixed on the surface of a friction probe defined by KES; the friction probe is slided in the warp and weft directions over the sliding sample fabric horizontally held with a constant tension; and a tension (namely, friction force) exerted on the friction probe is detected while a static load is being applied by the friction probe. In the measurement, the fabric affixed on the friction probe surface and the one horizontally held are prepared from the same sample, and the values of the coefficient of friction (MIU) in the warp and weft directions are obtained while the warp and weft directions of the former fabric are being made to agree with the warp and weft directions of the latter fabric, respectively.

The friction behavior of the coating surface on the coated fabric of the present invention is fundamentally based on the recessed and protruded contours of ridges and ribs formed by yarns forming the texture of fabric. In order to adjust the coefficient of friction to a given value in the present invention, it is important that the elastomer of the coating surface be applied along the recessed and protruded contours of the base fabric formed by the weaving or knitting structure, and yarns. The recessed and protruded shapes of the coating surface can be specified by the surface roughness (Ra) obtained by measurements with a laser.

In order to obtain a given coefficient of friction of a surface in the present invention, the surface roughness (Ra) of the coating surface should be 1.5 µm or more, preferably from 1.5 to 12 µm, more preferably from 2 to 10 µm.

The surface of a coating formed with an elastomer often has sticky properties, and the friction force becomes strong when the surface form is mirror-like, as shown in Comparative Examples 4 to be explained later. The surface shape having a surface roughness (Ra) in the range mentioned above is one that achieves the low coefficient of friction (MIU) specified by the present invention.

The tracer surface roughness (SMD) in measurement by KES in the warp and weft directions of the coating surface of the coated fabric in the invention is preferably from 2 to 10 µm, more preferably from 2.4 to 8 µm. The tracer surface roughness (SMD) in measurement by KES is a surface roughness obtained by placing on a sample a contact probe defined to measure the feeling of roughness that a human body senses and detecting a surface roughness by the up-and-down movement of the contact probe. The surface roughness is an average deviation of vertical displacements of the contact probe outputted with an electronic circuit. When the coating surface shape has a surface roughness of 10 μm or less, a low friction surface showing a preferred coefficient of friction (MIU) of the invention is obtained.

For the coated fabric of the present invention, the coated thin layer forming the recessed and protruded surface covers the entire surface of the base fabric in such a manner that penetration of the elastomer into the base fabric yarn is suppressed to the lowest degree. As a result, impermeability is imparted to the fabric. Formation of the coating surface roughness depends on the coating method and coating conditions as will be explained below. The preparation conditions of surface roughness relate to the flexibility, tear strength and flame proofness of the coated fabric. When the elastomer penetrates, even the array of single filaments forming the yarn of the fabric clearly appears on the coating surface, the value of (Ra) that represents the surface recesses and protrusions in terms of an average cross-sectional area of mountains and valleys increases. As a result, when the value of surface roughness (Ra) is 12 μm or less, penetration of the coating is significantly suppressed, and the fabric shows that the coated layer has the effects of improving the surface roughness. The sure presence of a coated layer on the fabric surface without penetration of the coating elastomer into the fabric achieves improvement of a tear strength. When the coated elastomer is penetrated into the yarn forming the fabric, filaments in the yarn are excessively constrained to each other. As a result, the constituent filaments are substantially broken, one by one, at the front where a tear is developed. On the other hand, when there is no penetration of the coated elastomer, the constituent filaments are cohered forming bundles by the coated thin layer at the front where a tear is generated, whereby a plurality of filaments are broken. Accordingly, the coated film that less penetrates into the filaments improves the tear strength of the fabric. Next, such a coated film adequately meets the requirements for air gas-impermeable properties, and contributes to shortening a deployment time. Moreover, the coating layer formed on the surface layer of the fabric has no excessively thinner portions, and is a robust layer. The fabric therefore meets the requirement of FMVSS 302 that the fabric shall pass the burning test.

As a result of observing horizontal burning behavior according to FMVSS 302, it has been found that when a fabric catches fire, a fabric that can firmly maintain the form of the coated layer with an elastomer suppresses spread of the fire. Conversely, it has also been found that when the coated layer is curled or forms cracks during burning, the fire spreads. Even when a coated fabric has a lightweight and thin coated layer, the coated fabric that has a coating layer formed without penetration into the fabric can ensure firm maintenance of the coating layer during burning. A fabric that can pass the burning test can thus be obtained.

It is preferred that the thickness of a coated layer composed of an elastomer in the coated layer be uniform if possible. It is preferred that a resin layer in a meai portion (intervening portion between the neighboring woven yarns) where the layer is thickest has a thickness of less than 3 relative to a film thickness of 1 in a weaving yarn portion where the layer is thinnest. The ratio of a thickness of the maximum layer thickness portion to a thickness of the minimum layer thickness portion is more preferably 2 or less. When the thickness variation of a coated layer is in the above range, the incineration burned layer in a thin layer portion is not broken during burning. As a result, a fire spread caused by diffusion of a combustion gas from the broken portion does not take place, and the coated fabric passes the FMVSS 302 burning test.

The coated fabric of the present invention has a bending rigidity (B: Bending rigidity per unit length/width (unit: mN·cm$^2$/cm) of preferably from 0.5 to 9 mN·cm$^2$/cm, more preferably from 1.5 to 8.5 mN·cm$^2$/cm measured by KES, both in the warp and in the weft directions. A coated fabric that has a low bending rigidity in the above range is excellent in foldability, and the storage volume of the airbag can be made still more compact.

The bending rigidity (B) obtained by measurement according to KES is a value obtained, using a pure bending machine (KES-FB2), by bending an entire fabric sample in an arch form with a predetermined curvature, changing the curvature at a constant rate and measuring the bending moment thus generated. Round trip curves of "bending moment-curvature" both in the front surface and in the back surface directions are obtained for each of the warp direction and the weft direction; a bending rigidity for the going trip and a bending rigidity for the returning trip are determined from the slopes of the corresponding linear portions with the respective centers placed at a zero curvature. The bending rigidity is determined by averaging the bending rigidity for the going trip and the one for the returning trip, and dividing the averaged value by the width of the coated fabric sample. Smaller bending rigidities (B), in both the respective warp and in the weft directions, show that the fabric is more flexible. A coated fabric having a bending rigidity (B) of 9 mN·cm$^2$/cm or less has the following advantages: the folded shape of the airbag is small, and an airbag having a more compact folded shape can be manufactured; the folding operability of the airbag is excellent, and it does not take much time to compactly fold the fabric. A low bending rigidity of the coated fabric contributes toward easily deploying the airbag and making an occupant feel a soft touch.

There is no specific limitation on the constituent yarn of the coated fabric in the present invention. However, the yarn is preferably one mainly containing polyhexamethylene adipamide, and is particularly preferably a polyhexamethylene adipamide (hereinafter referred to as nylon 66) yarn, a nylon 66 copolymer (nylon 66/6, nylon 66/6I, nylon 66/610, etc.) yarn, or a nylon 66 yarn obtained by blending nylon polymers (nylon 6, nylon 610, etc.), in view of the heat resistance.

These fiber materials may contain conventionally used various additives for the purpose of improving the productivity in the production step and texturing step of the raw yarn and the properties thereof. For example, the fiber materials may contain thermal stabilizers, antioxidants, light stabilizers, smoothing agents, antistatics, plasticizers, viscosity improver, pigments, flame retardants, delustering agents and the like.

The tensile strength of the yarn forming the coated fabric of the present invention is preferably 6 cN/dtex or more, more preferably 6.5 cN/dtex or more. Airbags that are obtained from a yarn having a tensile strength of 6 cN/dtex or more satisfy the pressure resistance tenacity required during deployment. A particularly preferred tensile strength is 6.5 cN/dtex or more. Although a yarn having a higher tensile strength is more preferred, the practical upper limit of the tensile strength is 10 cN/dtex in view of the productivity of the yarn.

A woven fabric, a knitted fabric, an unwoven fabric or the like is used as a base fabric for the coated fabric of the present invention. Examples of a suitable base fabric include woven fabrics having a texture such as a plain weave, a rip-stop weave and a bascket weave. Although there is no specific limitation on the method of weaving the base woven fabric, weaving by a loom used for general purposes, such as an air-jet loom, a water-jet loom, a lapier loom and a multi-phase weaving machine is possible. Of these looms, an air-jet loom and a water-jet loom are particularly preferably used for weaving in view of the productivity.

The base woven fabric is preferably a filamentary yarn-woven fabric wherein the weaving yarn used as a weft is formed from a multifilament yarn that has a size from 67 to 350 dtex and that is formed from a single filament having a size of preferably from 0.5 to 4.5 dtex, more preferably from 1 to 3.5 dtex. In particular, the base woven fabric is a woven fabric formed of filamentary yarns in which a yarn having a size of preferably from 67 to 250 dtex, more preferably from 100 to 250 dtex is used. The yarn size of a weaving yarn herein designates a total of single filament size per weaving yarn in the warp, weft directions used to form the woven fabric. When the yarn size as described above is 350 dtex or less, a lightweight, compact airbag can be obtained. When the total size is 67 dtex or more, the coated fabric comes to satisfy the mechanical properties during the action of the airbag such as a tensile tenacity and tear mechanical properties. A coated fabric obtained from a base woven fabric formed from a yarn having a single filament size of 4.5 detx or less is soft, can be easily bent, and is suitable for preparing an airbag that can be compactly folded and stored in the casing of an airbag module. The fiber forming the warp or weft yarn in the weaving structure of the woven fabric may also be a two or more folded yarn, doubling yarn or a double yarn.

The base woven fabric used for the coated fabric of the present invention has, in both the warp and in the weft directions, a product calculated by multiplying a yarn size of weaving yarn by a weave density (represented by a number of woven warp yarns <=ends>or woven weft yarns <=picks>/2.54 cm), namely, a woven yarn size parameters of preferably from 9,000 to 22,000 end(or pick)·dtex/2.54 cm, more preferably from 10,000 to 20,000 end(or pick)·dtex/2.54 cm, most preferably from 12,000 to 19,000 end(pick)·dtex/2.54 cm. When the woven yarn size parameter is 22,000 end(pick)·dtex/2.54 cm or less, the airbag thus obtained is lightweight and compact. When the woven yarn size parameter is 9,000 end(or pick)·dtex/2.54 cm or more, a sufficient pressure resistance tension can be given to the airbag. Use of the woven base fabric gives a coated fabric for airbag that satisfies mechanical properties during the action of the airbag such as tensile strength and tear strength.

In the present invention, examples of the elastomer for coating include commonly used elastomer such as chloroprene, chlorosulfonated olefin, silicone rubber, polyamide elastomer, styrene-butadiene resin, nitrile rubber, fluororubber and polyurethane. Of these elastomers, silicone having heat resistance, cold resistance and flame proofness is particularly preferred. An elastomer composition for coating may contain thickeners, flame-retardants, fillers, stabilizers and the like that are commonly used. In order to conveniently distinguish between the front and back surfaces of the coated fabric, the coated layer may be colored with a pigment or dye to have a distinguishing color.

The coating contains an applied solid component in an amount of preferably from 1 to 25 $g/m^2$, more preferably from 5 to 22 $g/m^2$. The fabric is coated with an elastomer in an amount as small as possible to form a coated fabric that has a small entire thickness and that is soft and inexpensive. When the coated layer contains a solid component in an amount of 25 $g/m^2$ or less, a coating surface having a recessed and protruded shape specific to the present invention can be obtained. It is necessary to select the conditions of a coating amount of an elastomer that can form a gas impermeable coated layer corresponding to the surface form of a woven fabric formed in accordance with the weaving texture and the size of the weaving yarn of the base fabric. In order to make an airbag lightweight, and increase the compactness thereof, the mass per unit area of the coated fabric of the present invention is preferably 200 $g/m^2$ or less, and the thickness is preferably 0.30 mm or less.

The coated fabric of the present invention can be produced by a method comprising coating a woven fabric composed of a weaving yarn that is formed from filaments with a single filament size from 0.5 to 4.5 dtex and that has a yarn size from 67 to 350 dtex and having a woven yarn size parameter, that is represented by the product of a weave density and a size of the weaving yarn, of from 9,000 to 22,000 end(or pick)·dtex/2.54 cm both in the warp and in the weft directions with an elastomer having a viscosity from 5,000 to 200,000 mPa·s in an amount of 1 to 25 $g/m^2$ under a linear pressure (contacting line pressure) from 1 to 500 kgf/m, and subjecting the coated woven fabric to a crosslinking treatment.

Elastomer composition such as an organic solvent dilution type, an aqueous emulsion type and a non-solvent type are used as coating liquid (dope). The coated layer surface form of the invention can be realized by selecting a viscosity range, contact pressure conditions and a coating head shape appropriate to a specific coating liquid. In particular, coating a fabric with a non-solvent type elastomer composition is preferred as a method of forming the surface form of the coated film of the invention. In the coating method using a non-solvent type elastomer composition substantially containing no organic diluent, the coating liquid has a viscosity of preferably from 5,000 to 200,000 mPa·s, more preferably from 10,000 to 100,000 mPa·s. When the elastomer composition has a viscosity of 5,000 mPa·s or more, penetration of the coating into the yarn can be suppressed as long as the elastomer composition has a higher viscosity. When the elastomer composition has a viscosity of 200,000 mPa·s or more, formation of a lightweight coating usually becomes difficult. For an organic solvent type elastomer composition, the solvent increases the permeability of the coating into the fabric. The coating liquid must therefore be adjusted to have a high viscosity. For example, the coating liquid must be made to have a viscosity of 50,000 mPa·s or more, preferably 80,000 mPa·s or more, by, for example, a method of increasing the molecular weight of the elastomer, or the like procedure. For an aqueous emulsion type elastomer composition, since water increases the permeability of the coating into the fabric, the coating liquid must be adjusted to have a high viscosity. A suitable thickener such as a carboxymethylcellulose salt is suitably added to adjust the viscosity to 10,000 mPa·s or more.

Contact pressing type coating is used as the coating procedure. Coating procedures such as various commonly used knife coating procedures, roll coating and reverse coating can be employed. When a coating procedure (gap procedure) in which a gap is provided between a base woven fabric and a coating head is practiced, not only the restriction of the coating amount is difficult but also a coating surface in which recesses and protrusions of ridges of a woven or knitted yarn texture are manifested cannot be obtained.

Contact pressing conditions in knife coating are as follows: a linear pressure is preferably from 1 to 500 kgf/m, more preferably from 20 to 200 kgf/m. When a fabric is coated at a linear pressure of 1 kgf/m or more, the coating amount on a base fabric can be adjusted to a small amount in comparison with the gap procedure. When the linear pressure is higher, a coating in a smaller amount can be realized. Moreover, a coating surface that utilizes the recessed and protruded shape of ridges of a yarn texture can be obtained. In the present invention, the recesses and protrusions of a fabric are made flat at the moment when the coating head works, and the coated layer is formed with a uniform thickness. Since the recesses and protrusions of the base fabric are recovered when the coating head passes, a coating face that traces the recessed and protruded shape of the base fabric surface is formed. Moreover, when the contact pressure is 500 kgf/m or less, an excellent coating can be formed. The contact pressure conditions can be suitably determined in accordance with the properties of the elastomer such as the viscosity, the coating head shape, the type of the coating liquid, and the like. The portion at which the fabric is contacted is related to a substantial contact pressure. For example, a knife having a thickness from about 2 mm to about 50 $\mu$m should be selected. A knife having a smaller thickness shows a higher substantial contact pressure; therefore, a recessed and protruded shape can be formed by coating the fabric with a lighter amount of a coating composition. In addition, the shape of the coating knife may be semicircular, rectangular or recessed at the knife head. The radius of the semicircular arc shaped knife head should be from 0.05 to 1.0 mm. The radius of curvature of the edge of the rectangular shape should be from 0 to less than 1.0 mm. The coating speed is preferably from 1 to 100 m/min, more preferably from 10 to 50 m/min. The upper limit of a coating speed is determined to be a speed sufficient to ensure a crosslinking residence time for which crosslinking of the elastomer is completed to lower its tackiness.

Crosslinking treatment following the coating should be carried out in accordance with the crosslinking system of the elastomer. For example, when a silicone is to be crosslinked with an addition type crosslinking agent, the elastomer should be heat treated at a temperature from about 150 to 230° C. for 0.1 to 5 minutes in order to volatilize the inhibitor for the catalyst of the crosslinking reaction and initiate and promote the addition reaction.

The procedure explained below is preferred. The adhesion amount of the finish oil or lubricant (percentage of the mass of the lubricant on the basis of the total mass that is the sum of the mass of the woven fabric and the mass of the lubricant) on the base fabric is determined to be 0.8% by weight or more. As a result, penetration of the coating liquid into the woven fabric is suppressed and a coating layer having a uniform thickness is formed along the recesses and protrusions of the yarn of the fabric. Lowering the friction of the coating surface can thus be manifested. When the adhesion amount of the lubricant is 0.8% by weight or more, the lubricant repels the coating liquid to prevent penetration of the coating liquid into the woven fabric. When the adhesion amount of the lubricant is 8% by weight or less, the adhesion of the coating elastomer to the fabric is never impaired.

Examples of the lubricant that is allowed to adhere to the base woven fabric include a spin finish oil and a warping oil. The adhesion amount of lubricant designates a total amount of these lubricants adhering to the woven fabric subsequent to coating. Procedures of allowing lubricant to adhere to the base fabric include a procedure of dipping the fabric in the lubricant and using it, and a procedure of allowing the lubricant to adhere to the raw yarn prior to forming a fabric and using the yarn without scouring. When the base fabric is a woven fabric in the present invention, the following procedure is preferred: a spin finish oil is allowed to adhere to the producer's yarn in advance prior to weaving the woven fabric, and the lubricant is allowed to remain without scouring the gray fabric. Moreover, a procedure comprising air-jet weaving a size-less producer's yarn for a woven fabric, and using the resultant woven fabric without scouring as a base woven fabric is preferred because the fabric can be used as a base woven fabric to which a spin finish oil uniformly adheres without losing the lubricant applied to the producer's yarn. In addition, when a heat-resistant smoothing agent is to be used as a spin finish oil that is allowed to adhere to the raw yarn for the woven fabric in the production step of the yarn, the lubricating agent is made to mainly contain dialkyl thiodipropionate. A combination of an emulsifying agent composed of PO/EO alkylpolyether and POE hardened castor oil trialkyl ester and the main component is used as the smoothing agent, and the emulsifying agent should be used in a blending ratio of 40% by weight.

When the base fabric is a woven one, a warping oil that is applied for the purpose of improving the weaving characteristics can be utilized. When a warping oil (or wax) is used, it may be allowed to adhere to a warp in an amount from 0.5 to 5.0% by weight, within the range of the adhesion amount of a oil mentioned above. A preferred warping oil is a heat-resistant oil that shows a difference in heating weight reduction ratios of 2% by weight or less, and that can prevent automotive windows from hazing. Preferred specific examples of the warping oil are oils mainly containing a mineral oil, synthetic paraffin or a glycerin ester having a high ignition point. In addition, the difference in heating weight reduction ratios is determined by the following procedure: two samples that are each prepared by accurately weighing 1 g of a warping oil on an aluminum dish 6 cm in diameter; the two samples are heated at 120° C. and 150° C., respectively on respective hot plates for 10 minutes; and the difference between a weight reduction ratio obtained by heating one sample at 150° C. and a weight reduction ratio obtained by heating the other sample at 120° C. is determined. In the present invention, it is preferred in view of weaving work that the adhesion amount of a warping oil on a warp be the same as or more than that of a total oil on a weft, and the adhesion amount of a total oil on a warp is particularly preferably greater than that of a total oil on a weft by 0.1% by weight or more in view of the weaving efficiency. Moreover, in order to prevent occurrence of mildew when a fabric is left over a long period of time, a mildew proof agent can be added to the lubricant. There is no specific limitation on the type and addition amount of the fungicidal agent so long as it does not exert adverse effects on the stability of the warping lubricant. A mixture of isothiazolone chloride, isothiazone and bromonitrile alcohol, or the like may be added in an amount from 0.02 to 0.5% by weight.

Prior to coating the base fabric, the fabric can be calendered. Calendering the base fabric prior to coating it has the advantage that the surface roughness of the woven fabric can be suitably adjusted so that the surface does not become a mirror surface. As a result of calendering, the fabric can be coated with a smaller amount of elastomer, and manifestation of a suitable recessed and protruded shape can be designed.

Although the base fabric may be calendered by hot compression, compression at room temperature, cold compression or the like, the base fabric is preferably calendered by hot compression. The heating temperature (calender roll) in calendering by hot compression can be determined by the combination of an applied pressure at a temperature below the melting point of the fiber material. From the standpoint of fixing the polymer structure of the base fabric constituent yarn, the heating temperature is preferably from 150 to 220° C. The calendering pressure is preferably from 1 to 100 kgf/cm in terms of linear pressure. Although the calendering speed can be suitably selected, it is preferably from 1 to 30 m/min. Various methods such as mentioned below can be employed as the compression method: a roll method in which the base fabric is compressed between rolls and passed therethrough at a constant speed; and a method in which the base fabric is compressed for a given time with a press. The calender roll may have a flat surface. The press material may be suitably selected from metal, ceramics, paper, elastomer, plastics or the like. A coated fabric having coating surface characteristics can be obtained with a smaller coating amount by improving the surface roughness of the base fabric so that the surface has a suitable surface roughness without becoming a mirror surface.

The present invention will be concretely explained by making reference to examples. "Parts" in examples designate parts by weight. In addition, methods of evaluating a coated fabric and an airbag in examples and comparative examples were as follows.

(1) Weave Density

The weave density was measured according to JIS L-1096 8.6.1.

(2) Coating Weight

A sample having an area (A) of about 0.3 m×0.3 m was taken from a fabric accurately, and dried at 105° C. for 2 hours or more. The sample is subsequently degreased with dichloromethane, and dried. The sample is then dissolved in 200 g of formic acid (90%) at room temperature for 3 hours. The insoluble component is separated by filtering with a glass sintered filter (manufactured by Vidrex Co., Ltd., trade name of Glass Filter 17G-3), adequately washed with formic acid, washed with water, and dried at 105° C. for 2 hours. The dried weight (M) of the insoluble component is measured. The coating weight (g/m$^2$) is obtained by dividing the formic acid-insoluble component (M) by the area (A) of the fabric sample.

(3) Tear Strength

The tear tenacity of a fabric is measured before and after coating, according to JIS L-1096 6.15.1 (single tongue method).

(4) Coefficient of Friction (MIU: Mean Value of the Coefficient of Friction <Unit: non>)

The coefficient of friction of a sample of coated fabric 20 cm wide and 20 cm long is measured by a surface-testing machine (KES FB4) under standard conditions defined by KES (The Standardization and Analysis of Hand Evaluation, 2$^{nd}$ Ed. S. Kawabata, The Textile Machinery Society of Japan, July 1980).

A contact probe (10 piano wires) each having a diameter of 0.5 mm being arrayed) defined by the reference of KES is used. A measured value obtained by affixing a sample fabric on the contact probe surface, and sliding the probe over sliding fabric that is horizontally held (tension for horizontally holding the fabric: 20 gf/cm) and that is the same as the fabric affixed to the probe is used. The contact load is then 50 gf, and the scanning speed for the measurement is 0.1 cm/sec. Measurements are made at different sites within the sample, and the average value (n=5) is obtained. Measures are taken to determine the friction between fabrics, in addition to the conditions defined by KES. That is, the first additional condition is as follows: a coated sample fabric, 8 mm×8 mm, is affixed on the friction surface of the probe. The second additional condition is as follows; when the fabric to be rubbed is horizontally held, the warp and weft directions of the sample fabric are made to agree with the warp and weft directions of the horizontally held fabric, respectively; and the coefficients of friction in the warp and weft directions are measured.

(5) Surface Roughness (Ra)

A laser reflection type displacement meter (trade name of LT-8010, having a spot diameter of 2 μm, manufactured by Keyence Corporation) is used as a probe, and a three coordinate measuring machine (manufactured by Sigma Koki Co., Ltd., stage: LMS-3D 500 XY (H)) is made to scan a fabric surface in the XY directions to measure the surface recesses and protrusions as height displacements. The surface roughness (Ra) according to JIS B-0601 is calculated using calculation software "LMS 3D" without setting a cut-off value. The measurement range is 4,000 μm×4,000 μm. First, measurements are made in the warp direction at 20 μm intervals by continuous scanning. The probe is then shifted by 20 μm in the weft direction, and measurements are made in the warp direction again; the procedure is repeated. Next, measurements are made in the weft direction at 20 μm intervals by continuous scanning. The probe is then shifted by 20 μm in the warp direction, and measurements are made in the weft direction again; the procedure is repeated. That is, measurements of height displacements are made on 40,401 lattice points at 20 μm intervals. The surface roughness is calculated in the following manner. First, the surface roughness values obtained by continuous scanning in the warp direction are averaged in the weft direction to give a surface roughness (Ra)w. Second, the surface roughness values obtained by continuous scanning in the weft direction are averaged in the warp direction to give a surface roughness (Ra)f. Finally, the surface roughness (Ra) of the sample surface was obtained by averaging both values.

Range of measurement: 4,000 μm×4,000 μm

Measurement points: 40,401 points (20 μm pitch)

(6) Tracer Surface Roughness (SMD: Mean Deviation of Surface Roughness (Mean Deviation of the Thickness <Unit: Micron>)

Using a surface testing machine (KES FB4), a coated fabric 20 cm wide and 20 cm long was measured under KES Standard conditions (The standardization and Analysis of Hand Evaluation, 7. 2$^{nd}$ Ed. S. Kawabata, 8. The textile Machinery Society of Japan, 9. 1980). Measurement conditions are as follows: a contact probe defined by KES (composed of a piano wire 0.5 mm in diameter) and attached to the apparatus was used with a contact load of 10 gf, a pressing spring constant of 25 gf/m; a scanning speed of 0.1 cm/sec; and a holding tension of the horizontally held fabric sample of 20 gf/cm. Measurements were made while the samples were changed, and the average value was obtained (n=5).

(7) Bending Rigidity (B: Bending Rigidity per Unit Length (Unit: mN·cm$^2$/cm))

Using a pure bending testing machine (KES FB2), measurements are made under KES standard conditions except that a coated fabric 5 cm wide and 10 cm long is used.

(8) METSUKE (Basis of Weight of Fabric) of Coated Fabric

The METSUKE is measured according to JIS L-1096 8.4.

(9) Thickness of Coated Fabric

The thickness is measured according to JIS L-1096 8.5.

(10) Burning Speed

The burning speed is measured according to FMVSS 302 (horizontal method).

(11) Gas-Permeability

The gas-permeability is measured according to JIS L-1096 6.27.1 A (Frazier method).

(12) Compactness (Thickness of a Folded Bag)

Figure 6:
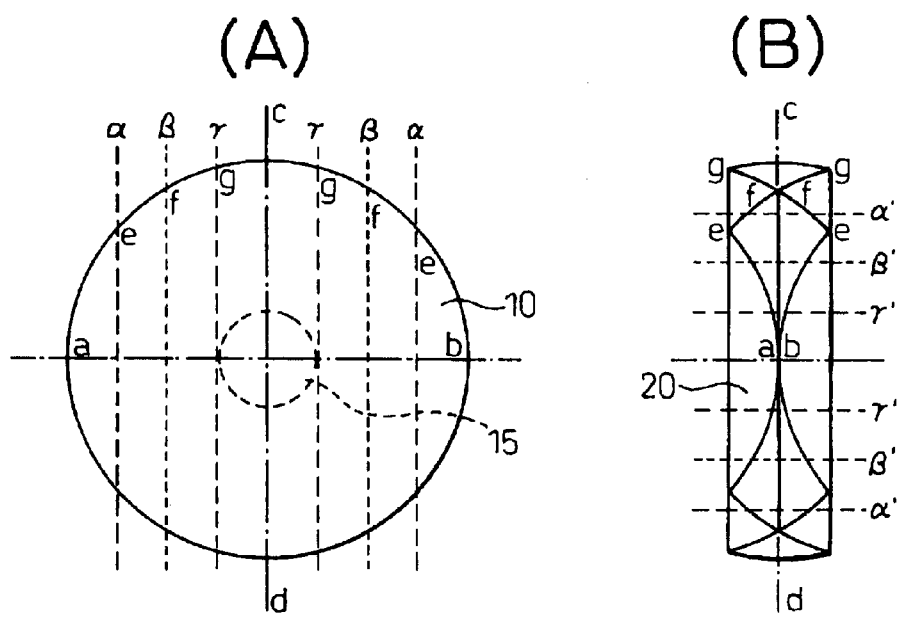
FIG. 6 shows explanatory views for illustrating how to fold an airbag for a driver's seat.
Figure 7:
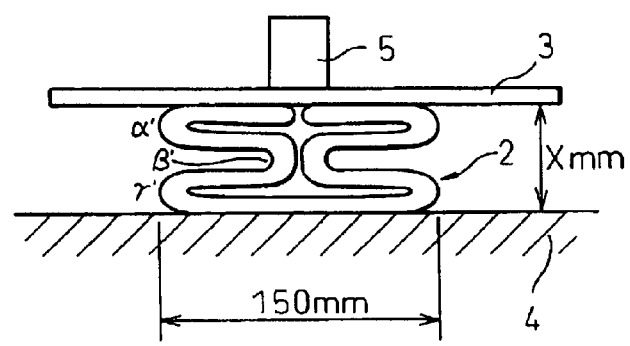
FIG. 7 is an explanatory view showing a method of measuring the folded thickness of an airbag for a driver's seat that is folded by the procedure shown in FIG. 6.

An airbag 10 (volume: 60 liters, a reference numeral 15 designates a gas-introducing port) that is circular in a plan view and that is prepared by a sewing method based on the description in the specification of International Publication WO 99/28164 is folded in the following manner. As shown in FIG. 6 (A), an edge a and an edge b are butted against each other on a centerline c–d. The airbag is then folded in a bellows-like manner to form a sequence of a hill top line of fold and a valley bottom line of fold along lines α, β and γ (at equal intervals), whereby an intermediate folded piece 20 is obtained (e, f and g in FIG. 6 (B) being peripheral edge lines). An edge c and an edge d of the intermediate folded piece 20 are butted against each other on a centerline a–b, and the folded piece is then folded in a bellows-like manner to form a sequence of a hill top line of fold and a valley bottom line of fold along lines α', β' and γ' to give a folded package 2 (see FIG. 7), 150 mm×150 mm. In FIG. 7, α', β' and γ' designate a hill line of fold and a valley line of fold in package 2 formed by folding along these lines.

Next, as shown in FIG. 7, the folded airbag is placed on a flat table 4. A glass plate 3, 300 mm×300 mm, is placed on the airbag, and a load is applied to the airbag with a 1 kg weight 5. The average thickness X (mm) is measured 30 minutes after applying the load.

(13) Deployment Time (Observed With a High Speed VTR)

An airbag (60 liters) for a driver's seat described in the specification of WO 99/28164 is prepared by sewing, and an inflator (non-azide type, with a maximum tank pressure of 185 kPa) is attached to the airbag to give a module. A deployment test is conducted at room temperature. In preparing the airbag, the warp direction and weft direction of the fabric on the front surface thereof are made to agree with the warp direction and weft direction of the fabric on the back surface thereof, respectively, and both surfaces are sewed.

The deployment state of the airbag is recorded with a high speed VTR. When the airbag observed from the front is deployed with 98% or more of the deployment distance in the entire peripheral directions based on the deployment distance achieved 48 msec after starting the deployment, the deployment is defined to be completed. The time from the start to the completion of deployment is defined as a deployment time.

(14) Deployment Uniformity of Airbag (Observed With a High Speed VTR)

An airbag (60 liters) for a driver's seat described in the specification of WO 99/28164 is prepared by sewing, and an inflator (non-azide type, with a maximum tank pressure of 185 kPa) is attached to the airbag to give a module. Deployment test is conducted at room temperature. In preparing the airbag, the warp direction and weft direction of the fabric on the front surface thereof are made to agree with the warp direction and weft direction of the fabric on the back surface thereof, respectively, and both surfaces are sewed.

Figure 2:
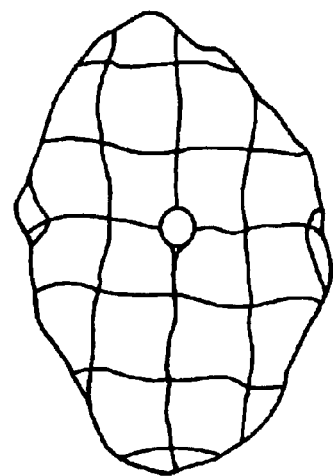

The deployment state of the airbag is recorded with a high speed VTR. The deployment forms of the airbag 14 msec and 19 msec after starting deployment are observed, and the deployment is evaluated. When a sample airbag viewed from the front is deployed while the airbag is maintaining a circular deployment shape, the deployment is defined to be uniform. The evaluation is made by the following criteria.

o: Uniform deployment (instances being shown in FIGS. 1 to 2)

Figure 3:
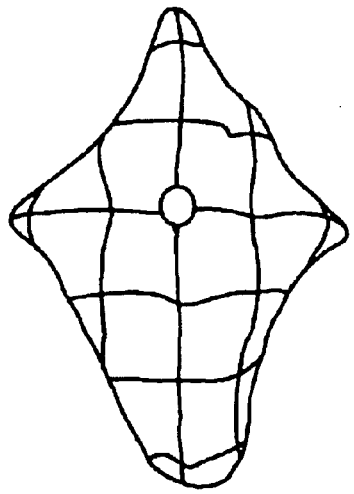
Figure 4:
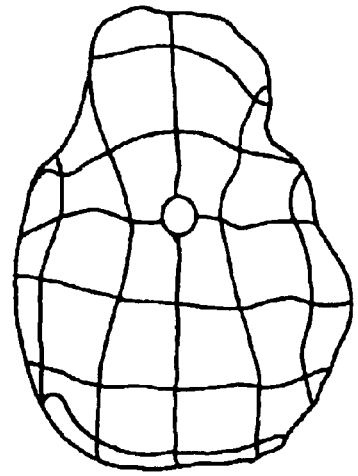
Figure 5:
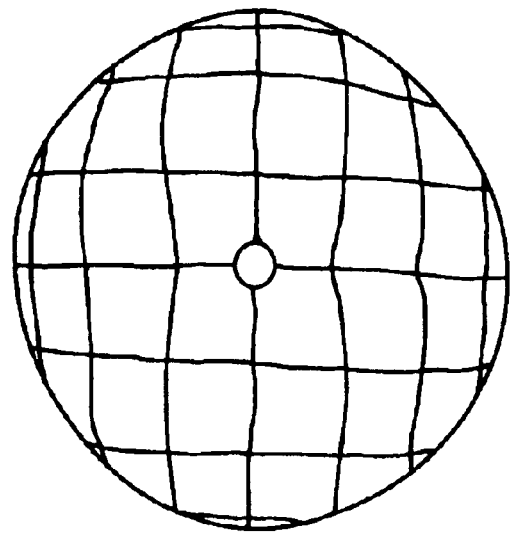

The airbag is expanded and deployed in a protruded shape without observing a definite delayed deployment in the entire circumferential directions and without forming recessed portions in the deployed periphery.

x: Nonuniform deployment (instances being shown in FIGS. 3 to 4)

There is a portion or portions showing a delay in the deployment among the entire circumferential directions, and a recess or recesses are evidently formed in the deployment periphery.

In addition, FIGS. 1 to 5 show instances of the steps of deployment of airbags at driver's seats observed from the front thereof with a high speed VTR in the deployment tests thereof.

(15) Evaluation of Deployment Pressure Resistance Tenacity

An airbag (60 liters; not vent holes provided) for a driver's seat described in the specification of WO 99/28164 is prepared by sewing, and attached to a high-pressure tank testing apparatus. A gas having a pressure is instantaneously introduced into the airbag at room temperature from the high-pressure tank, and a time taken from the introduction of the gas to the bursting of the airbag is determined. The maximum pressure within the airbag under the condition that the airbag is burst 100 msec after introduction of the gas having the pressure thereinto, namely, the deployment pressure resistance tenacity (kPa) thereof is determined.

EXAMPLES 1 TO 9 AND COMPARATIVE EXAMPLES 1 TO 9

Nylon 66 was melt spun with an extruder type spinning machine. After a spin finish oil was applied to the spun yarn, the yarn were hot drawn to give a nylon yarn. The yarn showed a tensile strength of 7.7 cN/dtex and an elongation of 21%, and had the applied spin finish oil in an amount of 0.5% by weight.

The spin finish oil was an emulsion containing 22% by weight of a mixture composed of 40 parts of dialkyl thiodipropionate 30 parts of PO/EO alkylpolyether and POE hardened castor oil trialkyl ester, and fed by nozzle oiling.

When the yarn was to be warped, S560 (trade name, manufactured by Goo Chemical Co., Ltd., a difference between a weight reduction ratio obtained by heating at 150° C. and a weight reduction ratio obtained by heating at 120° C. of 1.3%) was applied to the yarn as a warping oil by a kiss-roll system so that the warp yarn had 1.0% by weight of the applied oil in a total amount. Warp preparation such as beaming was conducted, and the yarn was woven on an air-jet loom (AJL) to give a woven fabric.

The woven fabric was not scoured, and was heat set at 170° C.

Using knives having various widths, the woven fabrics were coated with a silicone on one side at a rate of 10 m/min by the floating knife method while a linear pressure of 50 kgf/m was being applied to the woven fabrics. The woven fabrics subsequent to coating were heat treated at 180° C. for 3 minutes within a drying machine to give coated fabrics. The silicone herein contained 10 parts of LR 6200 A/B (trade name, manufactured by Wacker Asahikasei Silicone Co., Ltd.) and 3 parts of an organosilicone compound (trade name of HF 86, manufactured by Wacker Asahikasei Silicone Co., Ltd.) as an adhesion aid, had a viscosity of 20,000 mPa·s, and was used without dilution (Composition A). However, in Comparative Example 9, the woven fabric was not coated, and various evaluations were made.

Table 1 shows the characteristics of yarns used in Examples 1 to 9 and Comparative Examples 1 to 9, the evaluation results of the woven fabrics thus obtained and the results of deployment test of air bags prepared by sewing the woven fabrics.

TABLE 1

| | weaving yarn size dtex | Single filament size dtex | Weave density ends (or picks)/2.54 cm warp | weft | Woven yarn size parameter ends (or picks) · dtex/2.54 cm warp | weft | Tear strength prior to coating N warp | weft | T of k[1] mm | Amount of Coating g/m² | Coefficient of friction (MIU) warp | Weft | difference[2] |
|---|---|---|---|---|---|---|---|---|---|---|---|---|---|
| Ex.1 | 155 | 3.2 | 91 | 91 | 14105 | 14105 | 59 | 64 | 0.5 | 10 | 0.16 | 0.10 | 0.06 |
| Ex.2 | 175 | 3.1 | 83 | 83 | 14525 | 14525 | 77 | 82 | 0.5 | 13 | 0.15 | 0.16 | 0.01 |
| Ex.3 | 175 | 3.1 | 83 | 83 | 14525 | 14525 | 77 | 82 | 1 | 21 | 0.17 | 0.18 | 0.01 |
| Ex.4 | 175 | 3.1 | 83 | 83 | 14252 | 14525 | 77 | 82 | 1 | 25 | 0.18 | 0.26 | 0.08 |
| Ex.5 | 235 | 2.9 | 75 | 75 | 17625 | 17625 | 108 | 115 | 0.5 | 10 | 0.12 | 0.15 | −0.03 |
| Ex.6 | 235 | 6.7 | 75 | 75 | 17625 | 17625 | 110 | 119 | 0.5 | 10 | 0.13 | 0.18 | −0.05 |
| Ex.7 | 235 | 6.7 | 75 | 75 | 17625 | 17625 | 110 | 119 | 1 | 25 | 0.13 | 0.18 | −0.05 |
| Ex.8 | 350 | 5.9 | 61 | 59 | 21350 | 20650 | 135 | 142 | 0.5 | 11 | 0.10 | 0.13 | −0.03 |
| Ex.9 | 78 | 3.3 | 120 | 132 | 9360 | 10296 | 40 | 41 | 0.5 | 10 | 0.08 | 0.16 | −0.08 |
| CE.1 | 155 | 3.2 | 91 | 91 | 14105 | 14105 | 59 | 64 | 2 | 45 | 0.33 | 0.30 | 0.03 |
| CE.2 | 175 | 3.1 | 83 | 83 | 14525 | 14525 | 77 | 82 | 2 | 45 | 0.35 | 0.31 | 0.04 |
| CE.3 | 235 | 2.9 | 75 | 75 | 17625 | 17625 | 108 | 115 | 1.5 | 30 | 0.39 | 0.31 | 0.08 |
| CE.4 | 350 | 5.9 | 60 | 60 | 21000 | 21000 | 130 | 145 | 1.5 | 30 | 0.31 | 0.58 | −0.27 |
| CE.5 | 350 | 5.9 | 61 | 60 | 21350 | 21000 | 130 | 145 | 4 | 45 | 0.52 | 0.59 | −0.07 |
| CE.6 | 470 | 6.5 | 46 | 46 | 21620 | 21620 | 183 | 189 | 2 | 45 | 0.31 | 0.34 | 0.03 |
| CE.7 | 78 | 3.3 | 120 | 132 | 9360 | 10296 | 40 | 41 | 1 | 21 | 0.22 | 0.39 | −0.18 |
| CE.8 | 44 | 1.3 | 175 | 116 | 7700 | 5104 | 23 | 33 | 0.5 | 8 | 0.08 | 0.21 | −0.13 |
| CE.9 | 175 | 3.1 | 82 | 82 | 14350 | 14350 | 77 | 82 | — | No | 0.20 | 0.29 | −0.09 |

| | Tracer surface roughness (SMD) μm Warp | weft | Surface roughness (Ra) μ | Rigidity (B) mN·cm²/cm warp | weft | METSUKE g/m² | T[3] μm | Tear strength after coating N warp | weft | Burning speed mm/min | Gas-Permeability cc/cm² /sec | Compactness mm | Deployment time msec | U of d[4] |
|---|---|---|---|---|---|---|---|---|---|---|---|---|---|---|
| Ex.1 | 4.7 | 4.3 | 6.5 | 2.4 | 3.8 | 133 | 180 | 105 | 108 | 80 | 0 | 22 | 29 | ○ |
| Ex.2 | 5.6 | 5.8 | 9.5 | 2.0 | 3.8 | 136 | 200 | 119 | 123 | 80 | 0 | 22 | 30 | ○ |
| Ex.3 | 6.6 | 2.9 | 3.0 | 2.7 | 4.2 | 144 | 200 | 120 | 128 | s-ext* | 0 | 22 | 31 | ○ |
| Ex.4 | 6.1 | 2.8 | 2.4 | 2.4 | 4.2 | 150 | 200 | 122 | 132 | s-ext* | 0 | 22 | 33 | ○ |
| Ex.5 | 7.4 | 4.3 | 6.0 | 4.1 | 5.8 | 170 | 230 | 155 | 167 | 81 | 0 | 23 | 32 | ○ |
| Ex.6 | 7.7 | 4.1 | 5.4 | 5.9 | 7.6 | 170 | 240 | 155 | 167 | 82 | 0 | 27 | 34 | ○ |
| Ex.7 | 5.1 | 3.5 | 2.1 | 6.1 | 8.2 | 185 | 240 | 155 | 167 | s-ext* | 0 | 27 | 35 | ○ |
| Ex.8 | 9.7 | 5.2 | 6.1 | 5.5 | 8.9 | 186 | 270 | 175 | 180 | 85 | 0 | 28 | 37 | ○ |
| Ex.9 | 3.3 | 2.4 | 5.2 | 2.6 | 2.7 | 104 | 160 | 45 | 46 | 75 | 0 | 20 | 28 | ○ |
| CE.1 | 3.5 | 3.0 | 1.2 | 2.5 | 4.3 | 168 | 190 | 108 | 121 | s-ext* | 0 | 23 | 34 | ○ |
| CE.2 | 3.7 | 3.1 | 0.9 | 2.6 | 4.5 | 170 | 210 | 190 | 205 | s-ext* | 0 | 23 | 35 | ○ |
| CE.3 | 5.6 | 3.2 | 1.8 | 4.4 | 5.9 | 185 | 230 | 157 | 165 | s-ext* | 0 | 24 | 37 | x |
| CE.4 | 6.7 | 3.8 | 2.0 | 5.2 | 9.1 | 200 | 270 | 177 | 182 | s-ext* | 0 | 29 | 41 | x |
| CE.5 | 7.3 | 3.1 | 1.2 | 4.2 | 8.0 | 220 | 275 | 190 | 205 | s-ext* | 0 | 30 | 43 | ○ |
| CE.6 | 12.6 | 4.3 | 6.1 | 5.7 | 11.9 | 220 | 300 | 230 | 235 | s-ext* | 0 | 33 | 42 | ○ |
| CE.7 | 3.1 | 2.4 | 1.3 | 2.3 | 2.3 | 115 | 160 | 48 | 51 | s-ext* | 0 | 20 | 34 | x |
| CE.8 | 2.8 | 2.1 | 4.3 | 1.0 | 0.6 | 61 | 110 | 25 | 36 | 70 | 0 | 19 | — | — |
| CE.9 | 3.3 | 1.9 | 2.4 | 3.7 | 2.1 | 123 | 190 | — | — | s-ext* | 0.5 | 22 | 34 | ○ |

Figure 8:
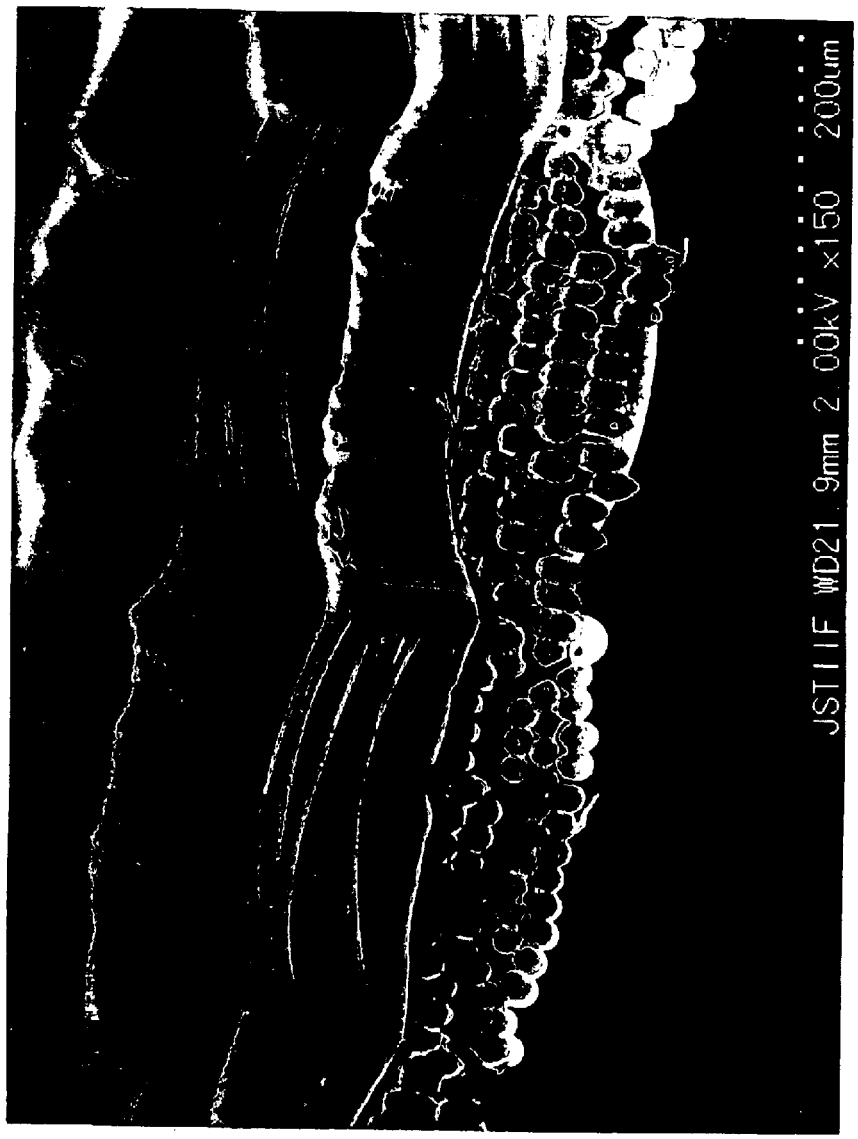
FIG. 8 is a SEM photograph (a magnification of 150, the 10 dot intervals represents 200 μm in the scale display) perspectively showing a cross section of a coated layer in a coated fabric (fabric coated on one side) in Example 2 of the present invention.

Note:
Ex. Example
CE. Comparative Example
[1]T of k = Thickness of knife
[2]difference = difference between coefficient of friction in the warp direction and coefficient of friction in the weft direction
[3]T = Thickness of coated fabric
[4]U of d = Uniformity of deployment
*s-ext = self-extinguishing FIG. 8 shows a SEM photograph of cross section of the coated fabric in Example 2. FIG. 8 shows that the surface shape of the coated layer on the coated fabric was formed along the recessed and protruded shape on the surface of the base woven fabric. It is therefore understood that a contact area was small when the fabric was slided. Accordingly, the coefficient of friction of the coating surface on the coated fabric was low in Example 2. The airbag prepared from the coated fabric in Example 2 showed a short deployment time, and good deployment uniformity because the difference between a coefficient of friction in the warp direction and a coefficient of friction in the weft direction was small.

Figure 9:
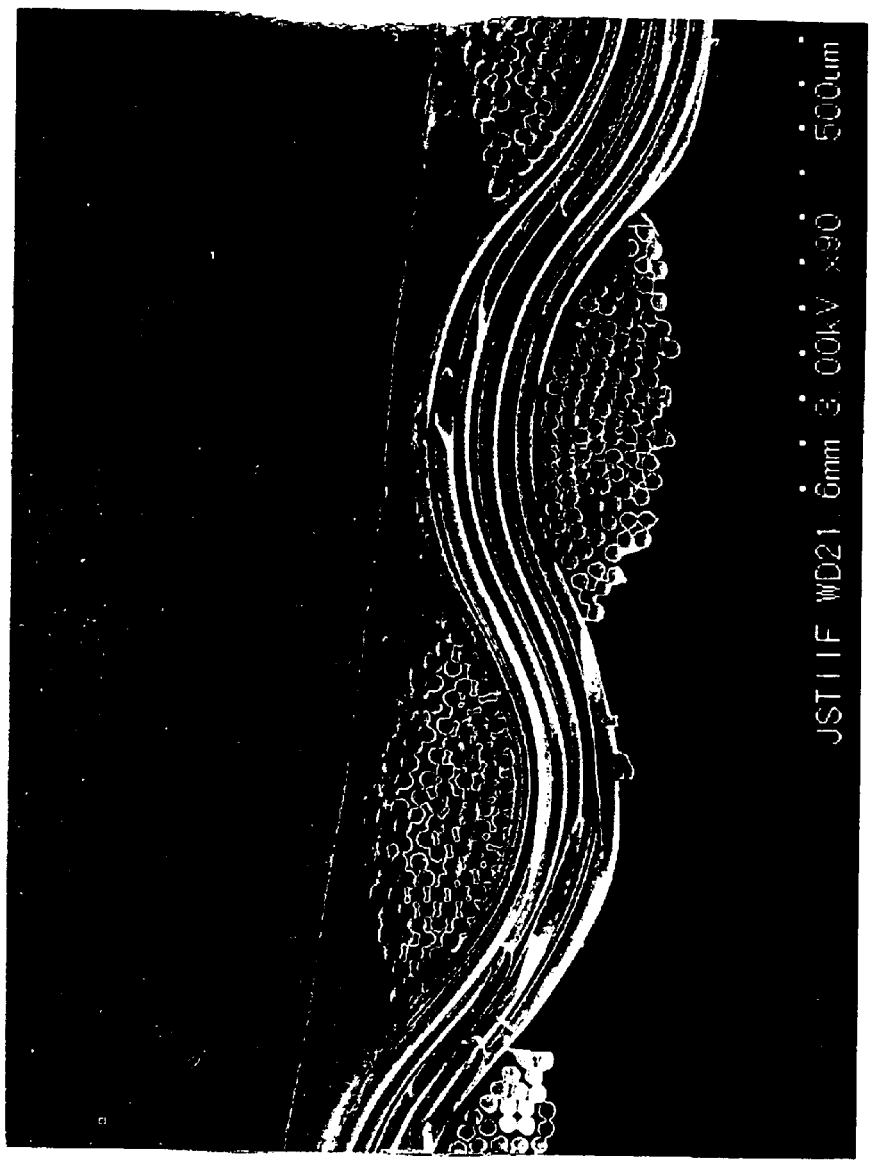
FIG. 9 is a SEM photograph (a magnification of 90, the 10 dot intervals represents 500 μm in the scale display) perspectively showing a cross section of a coated layer in a coated fabric (fabric coated on one side) in Comparative Example 5.

Example 2 and Comparative Example 9 will be compared. In Comparative Example 9, evaluation data on the base woven fabric itself in Example 2 were shown. The coated fabric in Example 2 had an elastomer coating, and showed improvements as explained below. The fabric could be made completely gas impermeable, and the coefficient of friction was decreased. The difference between a coefficient of friction in the warp direction and a coefficient of friction in the weft direction was made small. As a result, the deployment time of the airbag was shortened. On the other hand, the coated fabric in Comparative Example 5 was obtained by conventionally coating a woven fabric with a relatively large amount of a coating material. The coating surface of the fabric in Comparative Example 5 was flat as shown by a cross-sectional SEM photograph in FIG. 9. The contact area of the fabric was large when the fabric was rubbed, and the fabric showed a large coefficient of friction. The airbag prepared from the coated fabric in Comparative Example 4 showed a small deployment speed, and deployment of the airbag took much time. As shown in Comparative Example 4, when the coating weight was decreased, the coefficient of friction began to decrease. However, the decrease was insufficient, and the uniformity of deployment was poor due to a significant difference between a coefficient of friction in the warp direction and a coefficient of friction in the weft direction. Moreover, the coated fabric in Comparative Example 7 became highly frictional although it had a coating in an amount as small as 21 g/m$^2$ for the following reasons. The recesses and protrusions of the yarn texture of the fabric were small due to a low yarn size of the woven fabric, and the woven fabric showed that it tended to have a highly frictional flat surface even when the coating amount was small. Although the coated fabric in Comparative Example 8 showed a coefficient of friction in the range of the present invention, the base fabric showed a low tear tenacity, and the airbag was burst in a deployment test.

EXAMPLE 10 AND COMPARATIVE EXAMPLES 10 TO 11

The nylon woven fabrics shown in Examples 2 to 4 were coated with the following coating compositions: a coating composition B (Composition B) prepared by adding to 100 parts of a silicone (trade name of RD 6600 F, manufactured by Wacker Asahikasei Silicone Co., Ltd.) (xylene solution), 1.5 parts of an organopolysiloxane (trade name of Crosslinker W, manufactured by Wacker Asahikasei Silicone Co., Ltd.) the molecules of which have three or more hydrogen atoms bonded to Si and 1.5 parts of an organosilicone compound (trade name of HF 86, manufactured by Wacker Asahikasei Silicone Co., Ltd.) as an adhesion aid and having a viscosity of 80,000 mPa·s; a composition C (composition C) prepared by diluting the composition B with xylene to have a viscosity of 40,000 Pa·s; and a composition D (composition D) prepared by diluting the composition B with xylene to have a viscosity of 20,000 Pa·s. A woven fabric was coated with a silicone on one side by the floating knife method while a linear pressure of 50 kgf/m was being applied to the fabric. The fabric was then heat treated at 180° C. for 3 minutes within a drying machine to give a coated fabric. Table 2 shows the yarns, woven fabrics, coating conditions and the results of evaluating the characteristics of the coated fabrics.

When the coating liquid obtained by dilution with the organic solvent was highly viscous as in Example 10, desired effects could be obtained. However, when the coating liquid had a viscosity equal to or greater than that of a coating liquid without a solvent as shown in Comparative Examples 10 to 11, the coating liquid in the coating penetrates. The penetrated shape of the coating was manifested by a high surface roughness (Ra). The effects of penetration made the improvement of the tear tenacity insignificant, and caused the silicone coating to form cracks during burning in the burning test so that the fire spread due to flame propagation, resulting in rejection of the coated fabric in the test.

COMPARATIVE EXAMPLE 12

The nylon woven fabric shown in Examples 2 to 4 was coated with the following coating composition: a coating composition E that was a mixture solution obtained by stirring 52 parts of an aqueous silicone emulsion (trade name of Dehesive 38197 VP, manufactured by Wacker Asahikasei Silicone Co., Ltd.), 6 parts of an organopolysiloxane (trade name of V 20, manufactured by Wacker Asahikasei Silicone Co., Ltd.) the molecules of which each have three or more hydrogen atoms bonded to Si, 3 parts of an organosilicon compound (trade name of HF 86, manufactured by Wacker Asahikasei Silicone Co., Ltd.) and 37.5 parts of water, and having a concentration of 32% by weight and a viscosity of 80 mPa·s at 25° C.

The woven fabric was coated with the above coating composition under a linear pressure of 50 kgf/m using a floating knife coater. After coating, the water was removed by heating at 130° C. for 2 minutes, and crosslinking was effected by heating the coated woven fabric at 180° C. for 1 minute. Table 2 shows the yarn, woven fabric, coating conditions and results of evaluating the characteristics of the coated fabric.

Since the coating liquid that was an aqueous emulsion significantly penetrated, the permeability of the fabric could not be made zero. The coating surface definitely showed recesses and protrusions formed by the single filament of a yarn. The penetrated shape of the coating was manifested by a high surface roughness (Ra). Since the coating liquid penetrated, the tear tenacity was not improved, and the silicone layer formed cracks during burning in the burning test so that the fire spread due to flame propagation, resulting in rejection of the fabric in the test.

TABLE 2

| | Woven yarn size parameter dtex | Single filament size dtex | Weave density ends or picks /2.54 cm warp | Weave density ends or picks /2.54 cm weft | Woven yarn size parameter ends (or picks) · dtex/2.54 cm Warp | Woven yarn size parameter ends (or picks) · dtex/2.54 cm Weft | Tear strength prior to coating N warp | Tear strength prior to coating N weft | Coating liquid | T of k[1] mm | Coating wt. g/m² | Coefficient of friction (MIU) warp | Coefficient of friction (MIU) weft | difference[2] |
|---|---|---|---|---|---|---|---|---|---|---|---|---|---|---|
| Ex.10 | 175 | 3.1 | 83 | 83 | 14525 | 14525 | 77 | 82 | B* | 1 | 9 | 0.19 | 0.18 | 0.01 |
| CE.10 | 175 | 3.1 | 83 | 83 | 14525 | 14525 | 77 | 82 | C* | 1 | 9 | 0.22 | 0.14 | 0.08 |
| CE.11 | 175 | 3.1 | 83 | 83 | 14525 | 14525 | 77 | 82 | D* | 1 | 9 | 0.22 | 0.14 | 0.08 |
| CE.12 | 175 | 3.1 | 83 | 83 | 14525 | 14525 | 77 | 82 | E* | 1 | 8 | 0.16 | 0.09 | 0.07 |
| CE.13 | 175 | 3.1 | 83 | 83 | 14525 | 14525 | 77 | 82 | A* | 0.5 | 35 | 0.62 | 0.79 | −0.17 |

| | Tracer surface roughness (SMD) μm warp | Tracer surface roughness (SMD) μm weft | Surface roughness (Ra) μm | Ridgidity (B) mN · cm²/cm warp | Ridgidity (B) mN · cm²/cm weft | MET-SUKE g/m² | Thickness μm | Tear strength N warp | Tear strength N weft | Burning speed mm/min | Gas permeability cc/cm²/sec | Compactness mm |
|---|---|---|---|---|---|---|---|---|---|---|---|---|
| Ex.10 | 5.3 | 4.2 | 6.5 | 2.6 | 5.2 | 132 | 200 | 113 | 117 | s-ext[+] | 0 | 22 |
| CE.10 | 5.2 | 3.0 | 17.3 | 2.2 | 4.1 | 132 | 200 | 107 | 111 | 110 | 0 | 22 |
| CE.11 | 6.2 | 3.8 | 13.2 | 2.4 | 4.3 | 132 | 200 | 102 | 108 | 150 | 0 | 22 |
| CE.12 | 6.5 | 4.4 | 15.2 | 4.9 | 9.8 | 131 | 200 | 79 | 81 | 115 | 0.05 | 22 |
| CE.13 | 2.7 | 1.8 | 1.9 | 4.2 | 5.8 | 157 | 222 | 125 | 130 | s-ext[+] | 0 | 23 |

Note:
[1]T of k = Thickness of knife
[2]difference = difference between coefficient of friction in the warp direction and coefficient of friction in the weft direction
*A = non-solvent composition A
B = solvent-diluted composition B
C = solvent-diluted composition C
D = solvent-diluted composition D
E = emulsion composition E
[+]s-ext = self-extinguishing

COMPARATIVE EXAMPLE 13

The same nylon woven fabric as in Examples 2 to 4 was coated with the same silicone composition (composition A) as in Example 2. During the coating, the knife was subjected to a roll-on-knife type arrangement, and the woven fabric was coated while a gap of 20 μm was being provided between the fabric surface and the knife. Table 2 shows the yarn, woven fabric, conditions of coating and the results of evaluating the characteristics of the coated fabric. The coating surface showed a very high coefficient of friction, and was substantially flat when observed with an electron microscope.

EXAMPLE 11 AND COMPARATIVE EXAMPLES 14 TO 16

Table 3 shows the results of conducting the test of deployment pressure resistance tenacity using the coated fabrics in Example 2 and Comparative Examples 9, 10 and 12. In Example 11, it was observed that the effects of improving the tear tenacity of the fabric produced by a coating improved the deployment pressure resistance tenacity of the airbag compared with the uncoated airbag in Comparative Example 16. Moreover, the coatings penetrated the yarns in Comparative Examples 14 to 15, and as a result the tear tenacity was not improved or improved only slightly. The improvement of airbag deployment pressure resistance tenacity was therefore hardly obtained.

TABLE 3

| | Woven yarn size parameter dtex | Single filament size dtex | Weave density ends or picks/ 2.54 cm warp | Weave density ends or picks/ 2.54 cm weft | Woven yarn size parameter end (or pick) · dtex/2.54 cm Warp | Woven yarn size parameter end (or pick) · dtex/2.54 cm weft | Fabric used | Tear strength before coating N warp | Tear strength before coating N weft | Tear strength after coating N warp | Tear strength after coating N weft | DPT* kPa |
|---|---|---|---|---|---|---|---|---|---|---|---|---|
| Ex. 11 | 175 | 3.1 | 83 | 83 | 14525 | 14525 | Ex. 2 | 77 | 82 | 123 | 127 | 150 |
| CE. 14 | 175 | 3.1 | 83 | 83 | 14525 | 14525 | CE. 10 | 77 | 82 | 107 | 111 | 135 |
| CE. 15 | 175 | 3.1 | 83 | 83 | 14525 | 14525 | CE. 12 | 77 | 82 | 79 | 81 | 120 |
| CE. 16 | 175 | 3.1 | 83 | 83 | 14525 | 14525 | CE. 9 | 77 | 82 | — | — | 120 |

Note:
DPT* = Deployment pressure resistance tenacity

EXAMPLE 12 AND COMPARATIVE EXAMPLE 17

The nylon woven fabric shown in Example 1 was calendered with a metal/paper rolls (200° C., 80 tons/150 cm, 20 m/min), and coated with the coating composition in Example 1 under the coating conditions therein. The coated fabric was then heat treated at 180° C. for 3 minutes. Table 4 shows the yarns, woven fabrics, conditions of coating and the results of evaluating the characteristics of the coated woven fabrics.

TABLE 4

| | Woven yarn size parameter | Single filament size | Weave density ends or picks/2.54 cm | | Wovwn yarn size parameter end (or pick)· dtex/2.54 cm | | Processing | Tear strength prior to coating N | | T or k[1] | Coating | Coefficient of Friction (MIU) | | |
|---|---|---|---|---|---|---|---|---|---|---|---|---|---|---|
| | | | warp | weft | warp | Weft | | warp | weft | mm | wt. g/m² | warp | weft | Dif-ference[2] |
| | dtex | dtex | | | | | | | | | | | | |
| Ex.12 | 155 | 3.2 | 91 | 91 | 14105 | 14105 | Calendering | 59 | 64 | 0.5 | 7 | 0.09 | 0.10 | 0.01 |
| CE.17 | 155 | 3.2 | 91 | 91 | 14105 | 14105 | Calendering | 59 | 64 | 1 | 20 | 0.58 | 0.78 | 0.20 |

| | Tracer surface roughness (SMD) μm | | Surface roughness (Ra) μ μm | Ridgidity (B) mN·cm²/cm | | MET-SUKE g/m² | Thickness μm | Tear strength N | | Burning speed mm/min | Gas permeability cc/cm²/sec | Compactness mm |
|---|---|---|---|---|---|---|---|---|---|---|---|---|
| | warp | weft | | warp | weft | | | warp | weft | | | |
| Ex.12 | 3.6 | 2.1 | 5.0 | 2.5 | 2.3 | 130 | 180 | 113 | 115 | 85 | 0 | 22 |
| CE.17 | 2.8 | 1.6 | 1.9 | 1.9 | 2.2 | 143 | 190 | 118 | 120 | s-ext[3] | 0 | 22 |

Note:
[1]T of k = Thickness of knife
[2]difference = difference between coefficient of friction in the warp direction and coefficient of friction in the weft direction
[3]s-ext = self-extinguishing In Example 12, the woven fabric was calendared in advance to have a low surface roughness. As a result, the fabric came to have a low friction coating surface with a small amount of coating. In Comparative Example 17, the woven fabric was worked to have decreased recesses and protrusions; moreover, it was coated with the coating composition in such a large amount that the recesses and protrusions were embedded. As a result, the coating surface became flat, and the fabric became highly frictional.

INDUSTRIAL APPLICABILITY

The coated fabric of the present invention is a flexible, lightweight coated one that shows a low coefficient of friction of the coating surface on the fabric regardless of the gas-impermeable elastomer coating and an improved tear strength, and that meets the requirements for flame proofness and burning speed defined by FMVSS 302. The airbag for an airbag module prepared from the coated fabric of the present invention shows a short deployment time and is excellent in deployment uniformity. The airbag therefore can meet the requirement that an airbag should have the ability to restrain an occupant more rapidly. The airbag of the present invention is a lightweight one that is excellent in deployment pressure resistance, and that can be compactly stowed in the casing of an airbag module.

What is claimed is:

1. A coated fabric formed by coating a base fabric composed of a yarn having a size from 67 to 350 dtex with a coated silicone elastomer on at least one surface formed without the silicone elastomer penetrated into the interior of the base fabric cross section, and having impermeability, which is characterized by that the coefficient of friction (MIU) of the coating surface on the fabric measured by KES is from 0.01 and 0.3 both in the warp and in the weft directions, and that the absolute value of the difference between a coefficient of friction (MIU) of the coating surface in the warp direction and a coefficient of friction (MIU) thereof in the weft direction is 0.15 or less, and that the coating surface roughness of the coated fabric is from 1.5 to 12 μm.

2. The coated fabric according to claim 1, wherein the tracer surface roughness (SMD) of the coating surface on the fabric measured by KES is from 2 to 10 μm both in the warp and in the weft directions.

3. The coated fabric according to claim 1, wherein the bending rigidity per unit width (B) of the coated fabric measured by KES is from 0.5 to 9 mN·cm²/cm both in the warp and in the weft directions.

4. The coated fabric according to claim 1, wherein the base fabric of the coated fabric is composed of yarns mainly containing nylon 66.

5. The coated fabric according to claim 1, wherein the coated fabric contains, as a base fabric a woven fabric composed of a weaving yarn that is formed from filaments with a single filament size from 0.5 to 4.5 dtex and that has a yarn size from 67 to 250 dtex and having a woven yarn size parameter, that is represented by the product of a weave density and a size of the weaving yarn, of from 9,000 to 22,000 end (or pick)·dtex/2.54 cm both in the warp and in the weft directions, and the base fabric is coated with an elastomer in an amount from 1 to 25 g/m² on at least one surface of the base fabric.

6. The coated fabric according to any one of claims 1 and 2–5, wherein the base fabric has 0.8 to 8% by weight of a lubricant adhering thereto.

7. A base fabric for an air bag composed of the coated fabric according to any one of claims 1 and 2–5.

8. An air bag formed from the coated fabric according to any one of claims 1 and 2–5.

9. A method for producing a coated fabric formed by coating with a coated silicone elastomer layer on at least one surface without the silicone elastomer penetrated into the interior of the base fabric cross section, which comprises coating by a knife coater a woven fabric composed of a weaving yarn that is formed from filaments with a single filament size from 0.5 to 4.5 dtex and that has a yarn size of from 67 to 350 dtex, and having a woven yarn size parameter, that is represented by the product of a weave density and a size of the weaving yarn of from 9,000 to 22,000 end (or pick) dtex/2.54 cm both in the warp and in the welt directions, with a silicone elastomer having a viscosity from 5,000 to 200,000 mPa·s in an amount of 1 to 25 g/m$^2$ under a contact pressure from 1 to 500 kgf/m, and subjecting the coated woven fabric to crosslinking treatment.

10. The method for producing a coated fabric according to claim 9, wherein the elastomer is one substantially containing no solvent.

* * * * *

UNITED STATES PATENT AND TRADEMARK OFFICE
CERTIFICATE OF CORRECTION

PATENT NO. : 6,759,355 B2
DATED : July 6, 2004
INVENTOR(S) : Toshirou Nagaoka et al.

It is certified that error appears in the above-identified patent and that said Letters Patent is hereby corrected as shown below:

Column 25,
Line 7, "welt" should read -- weft --.

Signed and Sealed this

Twenty-first Day of December, 2004

JON W. DUDAS
*Director of the United States Patent and Trademark Office*